(12) United States Patent
Goldberg

(10) Patent No.: US 10,518,130 B2
(45) Date of Patent: Dec. 31, 2019

(54) INSTRUCTING ACTIONS OF ATHLETES USING DATA FROM PERIPHERALS

(71) Applicant: Robert Marc Goldberg, Fayetteville, NY (US)

(72) Inventor: Robert Marc Goldberg, Fayetteville, NY (US)

(*) Notice: Subject to any disclaimer, the term of this patent is extended or adjusted under 35 U.S.C. 154(b) by 393 days.

(21) Appl. No.: 15/410,142

(22) Filed: Jan. 19, 2017

(65) Prior Publication Data

US 2017/0189750 A1 Jul. 6, 2017

Related U.S. Application Data

(63) Continuation-in-part of application No. 14/872,550, filed on Oct. 1, 2015, now Pat. No. 9,604,100.
(Continued)

(51) Int. Cl.
*A63B 24/00* (2006.01)
*A63B 69/00* (2006.01)
(Continued)

(52) U.S. Cl.
CPC ...... *A63B 24/0021* (2013.01); *A63B 24/0003* (2013.01); *A63B 59/20* (2015.10);
(Continued)

(58) Field of Classification Search
CPC .. H04W 4/02; A63B 2225/20; A63B 24/0062; A63B 220/12
See application file for complete search history.

(56) References Cited

U.S. PATENT DOCUMENTS 4,254,956 A 3/1981 Rusnak
4,615,526 A 10/1986 Yasuda et al.
(Continued)

FOREIGN PATENT DOCUMENTS

EP 1908499 A1 4/2008
EP 2641235 A1 9/2013

OTHER PUBLICATIONS

WIPO, "International Search Report and Written Opinion of the International Searching Authority, International Application No. PCT/US2015/053486, dated Dec. 21, 2015", International Search Report and Written Opinion of the International Searching Authority, International Application No. PCT/US2015/053486, dated Dec. 21, 2015.

*Primary Examiner* — Reginald A Renwick
(74) *Attorney, Agent, or Firm* — Paul Frank + Collins P.C.

(57) ABSTRACT

A system that is configured to coordinate movement of athletes during drills and exercises. The system may be configured for receiving position data, in real-time, that relates to a location of a player on a venue, comparing the position data with registration data for tracked locations on the venue found in an instruction listing, selecting an instruction from the instruction listing indicating that the real-time position data corresponds with the registration data for the tracked locations, and generating an output that conveys the instruction to the player to perform an action. In on implementation, the system 100 may also process ball-related data, in conjunction with the real-time position data, where the ball-related data relates to the presence or absence of the ball at, near, or in proximity to portable equipment (e.g., a lacrosse stick) carried by the athletes during game play.

20 Claims, 15 Drawing Sheets

Related U.S. Application Data

(60) Provisional application No. 62/058,899, filed on Oct. 2, 2014.

(51) Int. Cl.
    *A63B 71/06*         (2006.01)
    *A63B 59/20*         (2015.01)
    *G09B 19/00*        (2006.01)
    *A63B 102/14*       (2015.01)

(52) U.S. Cl.
    CPC .......... *A63B 69/00* (2013.01); *A63B 71/0622* (2013.01); *G09B 19/0038* (2013.01); *A63B 2024/0053* (2013.01); *A63B 2071/0625* (2013.01); *A63B 2071/0655* (2013.01); *A63B 2071/0658* (2013.01); *A63B 2102/14* (2015.10); *A63B 2208/0204* (2013.01); *A63B 2220/12* (2013.01); *A63B 2220/17* (2013.01); *A63B 2220/24* (2013.01); *A63B 2220/40* (2013.01); *A63B 2225/20* (2013.01); *A63B 2225/50* (2013.01)

(56) References Cited

U.S. PATENT DOCUMENTS

| | | | |
|---|---|---|---|
| 5,031,909 A | 7/1991 | Pecker | |
| 5,056,783 A | 10/1991 | Mateovich et al. | |
| 5,651,549 A | 7/1997 | Dill et al. | |
| 6,652,284 B2 | 11/2003 | August et al. | |
| 7,651,418 B2 | 1/2010 | Appleton et al. | |
| 7,931,563 B2 | 4/2011 | Shaw et al. | |
| 8,152,661 B2 | 4/2012 | House | |
| 8,162,772 B1 | 4/2012 | Galloway | |
| 8,172,722 B2 | 5/2012 | Molyneux et al. | |
| 8,342,968 B2 | 1/2013 | Fuccillo et al. | |
| 8,414,411 B2 | 4/2013 | Stiles et al. | |
| 8,602,922 B2 | 12/2013 | Schwenger et al. | |
| 8,622,843 B2 | 1/2014 | Fuccillo et al. | |
| 8,777,815 B2 | 7/2014 | Case, Jr. et al. | |
| 8,968,100 B2 | 3/2015 | Hohterl | |
| 9,474,952 B2 | 10/2016 | Fuccillo et al. | |
| 9,544,075 B2* | 1/2017 | Altman | H04H 60/90 |
| 9,824,532 B2* | 11/2017 | Abouchar | G07F 17/3225 |
| 2003/0017882 A1 | 1/2003 | Hossack | |
| 2003/0207718 A1 | 11/2003 | Perlmutter | |
| 2008/0015058 A1 | 1/2008 | Noble et al. | |
| 2009/0029754 A1 | 1/2009 | Slocum et al. | |
| 2010/0259407 A1* | 10/2010 | Tilvis | A63B 24/0062 340/686.6 |
| 2011/0212757 A1 | 9/2011 | Mudock et al. | |
| 2011/0304497 A1 | 12/2011 | Molyneux et al. | |
| 2012/0139727 A1 | 6/2012 | Houvener et al. | |
| 2012/0190486 A1 | 7/2012 | Hubschmann | |
| 2012/0295743 A1 | 11/2012 | Creguer | |
| 2013/0053190 A1 | 2/2013 | Mettler | |
| 2013/0282438 A1* | 10/2013 | Hunter | G01S 1/02 705/7.32 |
| 2014/0200065 A1* | 7/2014 | Anderson | G07F 17/3209 463/20 |
| 2015/0054632 A1 | 2/2015 | Ben Ezra | |
| 2015/0202510 A1 | 7/2015 | Appleton et al. | |

* cited by examiner

FIG. 1
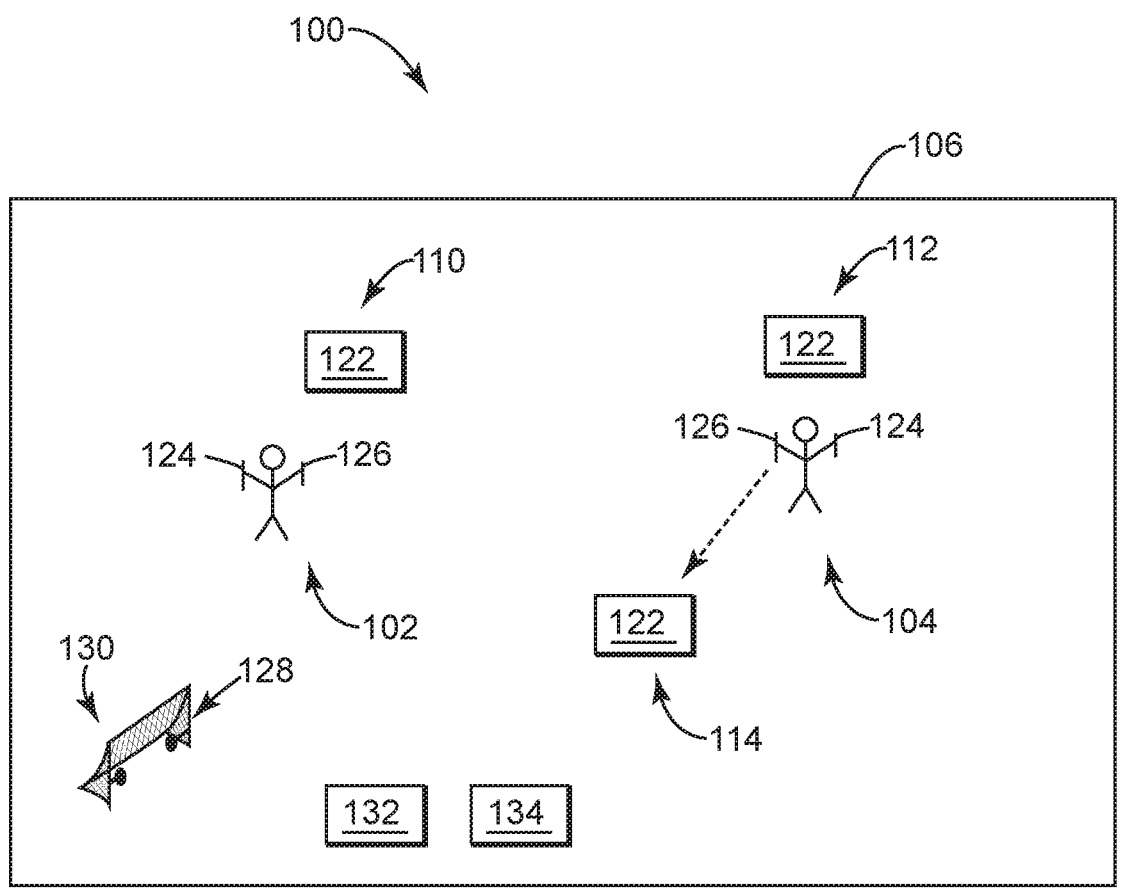
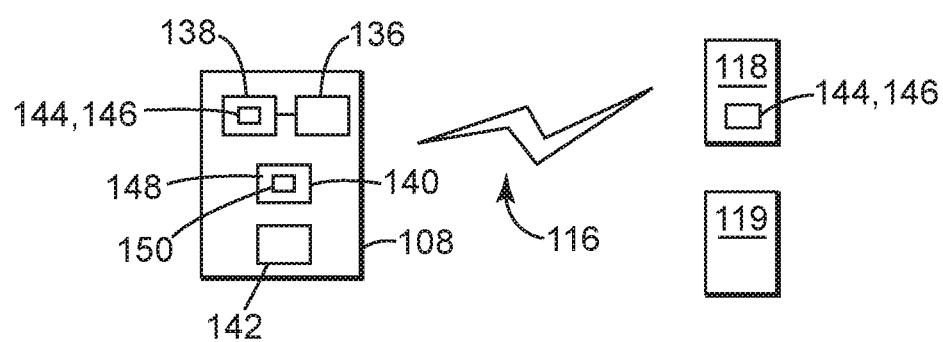

US 10,518,130 B2

INSTRUCTING ACTIONS OF ATHLETES USING DATA FROM PERIPHERALS

CROSS-REFERENCE TO RELATED APPLICATIONS

This application is a continuation-in-part of U.S. application Ser. No. 14/872,550, filed on Oct. 1, 2015, and entitled "SPORTS TRAINING AID," which claims the benefit of priority to U.S. Provisional Application Ser. No. 62/058,899, filed on Oct. 2, 2014, and entitled "LACROSSE TRAINING DEVICE." The content of these applications is incorporated by reference herein in its entirety.

BACKGROUND

Teams and individual athletes often train extensively to become proficient in skills particular to their respective endeavors. Training can take many forms. Drills and exercises that focus on certain facets of a sport may be useful to enforce muscle memory and knowledge of the game.

SUMMARY

The subject matter disclosed herein relates, in part, to improvements to training of athletes through drills and exercises. Of particular interest are ways to automate processes that coordinate actions of the athletes. The processes may translate to the athletes via a network of devices, possibly including a terminal and peripherals that can exchange signals. Examples of these signals can convey data that may allow the system to cause the athletes to perform a pre-determined pattern of actions. This pattern can arise from select instructions that originate from a sequential listing of instructions that effectively breaks down the pattern into its discrete, operable actions. In one implementation, the terminal can access the sequential listing to select instructions, often transmitting signals to convey data among the player tracking devices. This data can cause the player tracking devices to generate an output that the player can recognize as to the next action to perform in the pattern.

The embodiments may find use in a variety of sports and athletic activities. For example, lacrosse is a popular sport in North America and throughout the world. The sport requires participants to use sticks to carry, pass, and shoot a ball. Part of the sport includes a face-off that occurs periodically during play of the game. In this regard, the peripherals may include a lacrosse stick that is specifically outfit with sensors to track actions that relate to skills that are essential to play of the game. The sensors can communicate with an on-board controller that can operate among several training modes to allow a player to practice and develop these skills.

BRIEF DESCRIPTION OF THE DRAWINGS

Reference is now made briefly to the accompanying figures, in which:

FIG. 1 depicts a schematic diagram of an example embodiment of a system that may be useful to train athletes;

Figure 2:
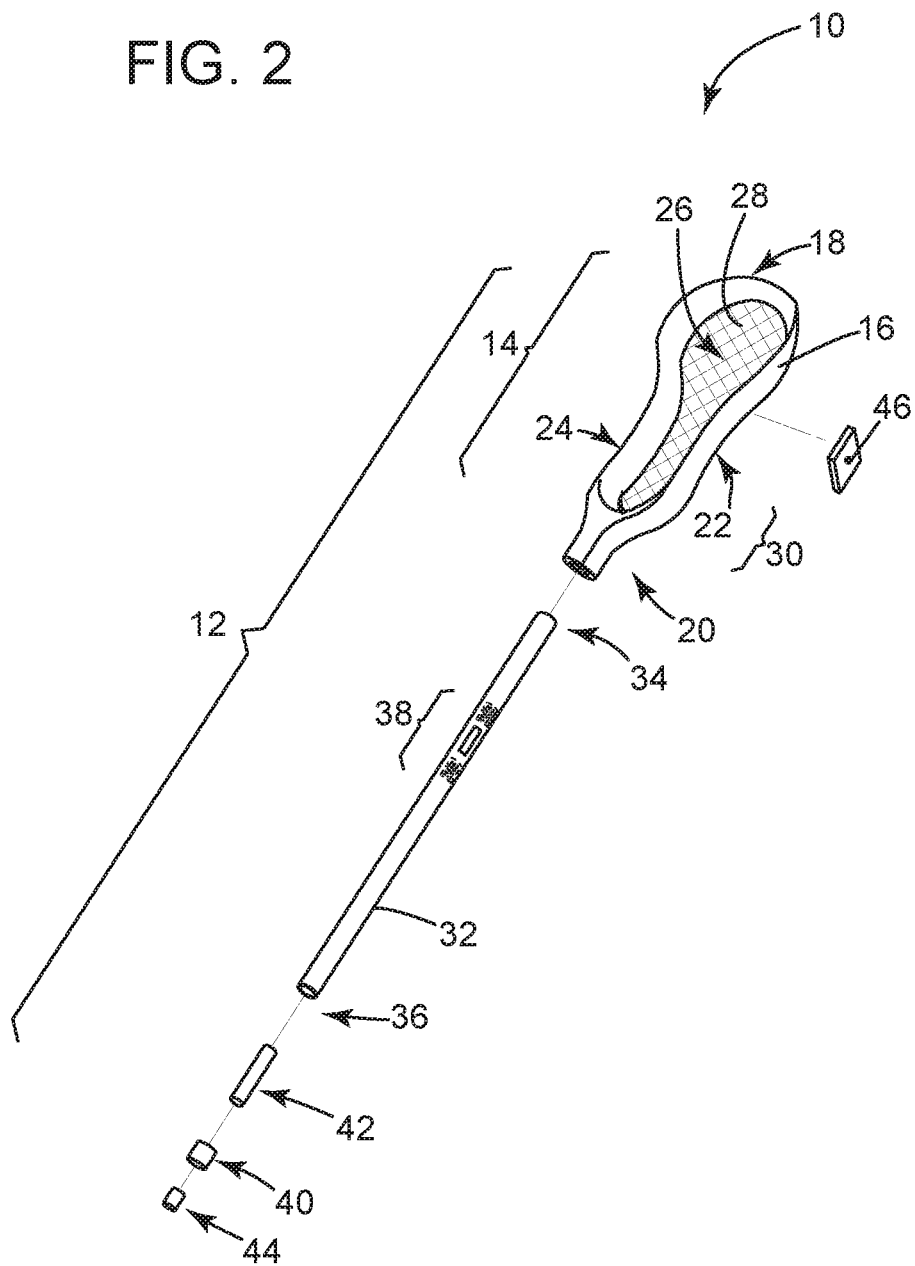
FIG. 2 depicts a perspective view of an example of a lacrosse stick in exploded form for use by the athletes of FIG. 1.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments of a system that can instruct actions of players on a field. These embodiments may integrate technology that can correlate a position of the player with outputs, typically audible or visual, that can cause the player to run, dodge, pass, shoot, or otherwise act in a manner consistent with an athletic activity. Other embodiments are within the scope of the subject matter disclosed herein.

FIG. 1 depicts a schematic diagram of an exemplary embodiment of a system 100 that may be useful in sports training. This embodiment may orchestrate activity of one or more individuals or "players" (e.g., a first player 102 and a second player 104) at venue 106. The players 102, 104 may be part of a "team" that participates in the athletic activity (e.g., soccer, football, basketball, baseball, hockey, lacrosse, field hockey, etc.). Examples of venue 106 may embody a "field" that hosts this athletic activity. But other examples of venue 106 could also operate simply as space (e.g., backyard, parking lot, etc.) to allow the players 102, 104 to undertake some type of activity as the team, a subset of the team, or individually.

The system 100 may include a terminal 108 that is used to register one or more tracked locations (e.g., a first tracked location 110, a second tracked location 112, and a third tracked location 114). The terminal 108 may embody a computing device (e.g., a smartphone, tablet, laptop, etc.). The tracked locations 110, 112, 114 may correspond with registration data that the terminal 108 may store, whether locally or remotely in a network 116, for example, at a remote storage memory 118 that might be part of a "cloud"

storage system with a computing device 119 (also, "server 119"). Examples of the registration data may be in the form of Cartesian coordinates (e.g., x, y, z) or geographic coordinates (e.g., degrees, minutes, seconds), although other location-identifying systems (e.g., north, south, east, west) may also suffice.

The system 100 may include peripherals 120 that work in conjunction with the terminal 108. The peripherals 120 may include physical markers 122 that co-locate at the tracked locations 110, 112, 114 to identify them on venue 106. Portable equipment 124 may transit with the players 102, 104 as part of game play. In one example, which is used throughout, the portable equipment 124 may embody a lacrosse stick. But the concepts herein may extend to other sports with devices (e.g., hockey sticks, baseball bats, baseball gloves, etc.) that travel with the players 102, 104. As also shown, the players 102, 104 may also carry a wearable element 126 that may generate data, like a smartwatch, smartphone, fitness tracker, etc. In some implementations, the peripherals 120 may include a target frame 128 that resides on or proximate a goal 130, as well as other devices that may embody a timer 132, for example, a "shot clock" that can incrementally measure time, and a radar gun 134 that can measure shooting speed.

At a high level, the system 100 may be configured to effectively orchestrate actions of the players 102, 104 on venue 106. These configurations may use position data, received in real-time, to detect movement (or non-movement) of the players 102, 104 relative to the tracked positions 110, 112, 114, the peripherals 120, or other points of interest on venue 106. In turn, the system 100 can use this movement to issue "sequential" instructions that direct "traffic" on venue 106. The traffic may correspond with set or pre-determined plays, drills, and like exercises that train the players 102, 104 for competition in the athletic activity. This feature effectively automates instructions that might originate from a coach, supervisor, or coordinator for the athletic activity instructions to the players 102, 104. As an added benefit, however, the system 100 may also be configured to detect the presence or absence of a projectile at the portable equipment 124. Examples of the projectile may be a ball, puck, or like implement that the players 102, 104 use to effect game play. The system 100 may use this "ball-related" data to detect the location or movement (or non-movement) of the projectile relative to the players 102, 104, as well as among the terminal 108, the tracked locations 110, 112, 114 of the other points of interest as noted herein. This feature is beneficial for the system 100 to correlate both the real-time position data and the ball-related data to localize the sequential instructions to correspond to individual activities performed by the players 102, 104.

The system 100 can use a variety of technology to generate the real-time position data. The peripherals 120 may be outfit with a GPS-enabled device that generates GPS data consistent with a global positioning system (GPS) or similar equipment. The system 100 may also leverage proximity sensors that install at or near the tracked locations 110, 112, 114. These proximity sensors may include devices that work in conjunction with localized "field" generators found on the players 102, 104 to generate data. Exemplary devices may use infrared sensors that trigger in response to infrared light that radiates from the wearable element 126. The proximity sensors may also embody pressure sensors or pressure sensitive devices that reside at or near the tracked locations 110, 112, 114. Such devices may generate data in response to contact, for example, from a foot of the players 102, 104 that transit across venue 106. In other implementations, the system 100 may incorporate a visual detection device, possibly a camera with a field of view that cover of all or part of venue 106. Light imaging, detection, and ranging (LIDAR) or related surveying and measurement technology may also suffice. The system 100 can process images (or, generally, image data) from the visual detection device to identify the location of the players 102, 104 relative to the tracked locations 110, 112, 114 or other point of interest at venue 106.

The system 100 may be configured to facilitate the exchange of signals among the hardware and components. These configurations may create a localized network (e.g., a "mesh network") or other topology to provide structured intercommunication among the devices in order for the system 100. Exemplary networks may leverage wired or wireless protocols like Bluetooth®, ZigBee®, and WiFi. This feature may permit exchange of the real-time position data, the ball-related data, and the instructions to the players 102, 104, often without the need for capabilities that require external computing devices or networks (e.g., network 116).

The instructions may take the form of an output (e.g., audio, visual, haptic, etc.) that originate from the terminal 108 or the peripherals 120. The format may leverage integrated speakers, lights, vibration motors, and the like. In one implementation, the output may elicit a response from the players 102, 104, preferably an action or actions that correspond to the athletic activity. Exemplary actions may call for one or more of the players 102, 104 to throw a ball in a particular direction or to a particular location or to perform an "athletic move" like a dodge. Other actions may require the players 102, 104 to transit between tracked locations 110, 112, 114 or to some other location on the playing field or space of venue 106.

The physical markers 122 may be configured for operation that is passive or active. Generally, the devices may be able to generate the output in certain format to instruct the players 102, 104. Active devices may also be outfit to detect proximity of players 102, 104, for example, using the localized "field" generators noted above. These physical markers 122 may embody cones, for example, although flat shapes of flexible rubber imprinted with instructional words or symbols, or electronic modules with LED and/or audio output wirelessly controlled by system 100 may also be reasonable with the scope of the subject matter herein.

Referring back to FIG. 1, the terminal 108 may embody a computing device that is portable for travel onto venue 106 by an end user (e.g., coach). Exemplary computing devices may include portable electronics (e.g., smartphones, tablets, etc.), although laptop and desktop computers may also provide functionality that comports with use as part of the system 100. As shown, the computing device may have a structure that leverages electronic components (e.g., a processor 136, a storage memory 138, a display 140, and outputs 142). Data 144 and executable instructions 146 in the form of software and computer programs may be found on the storage memory 138 and the storage memory 118, as desired. Further, the remote computing device 119 may be equipped with one or more processors and memory. On the display 140, the terminal 108 may generate an interface 148 having icons 150.

In use, the system 100 may leverage the interface 148 to record registration data for each of the tracked locations 110, 112, 114 (and any other location at venue 106, as contemplated herein). The resulting record may be stored and, as noted more below, may form part of an instruction listing that is useful for the system 100 to coordinate actions of the players 102, 104. This functionality may use one or more of the real-time position data and the ball-related data. In one implementation, the interface 148 may instruct the end user (e.g., a coach) to manually capture GPS data from the GPS device on-board the terminal 108 (e.g., by pressing an icon 150) when in position at each of the tracked locations 110, 112, 114. This technique may also be used to enter registration data for certain peripherals (e.g., goal 130), or to specified points of interest including end lines, goal lines, side lines, box lines, or unmarked locations or areas that might have specific interest to the athletic activity (e.g., "5×5," "X," or "behind the goal").

Figure 3:
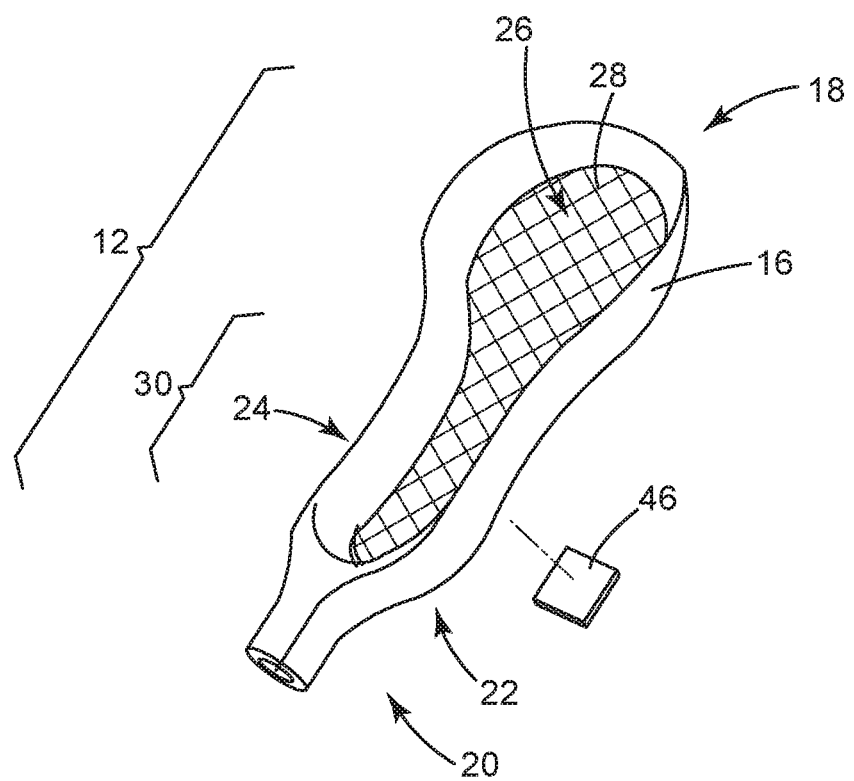
FIG. 3 depicts a perspective view of part of the lacrosse stick of FIG. 2 in exploded form.
Figure 4:
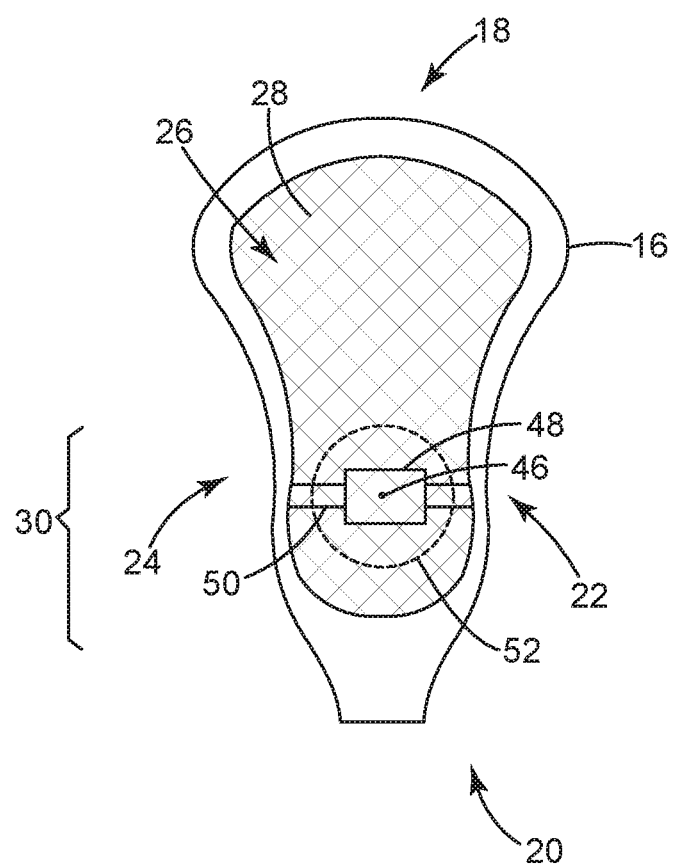
FIG. 4 depicts an elevation view of part of the lacrosse stick of FIG. 2.

FIGS. 2, 3, and 4 illustrate an example 10 of the portable equipment 124. This example embodies a lacrosse stick 12 (also, "stick 12"). The stick 12 includes a head 14 with a frame 16 formed typically as a one-piece or unitary structure of moldable material (e.g., plastic). The frame 16 has a top 18, a bottom 20, and a pair of sidewalls (e.g., a first side wall 22 and a second sidewall 24). These parts collectively bound a central open region 26. The head 14 may include a netting 28 (also, "stringing 28") that spans the frame 16 to cover the open region 26. The netting 28 can comprise strings or fibers, often individually wound together or provided in a pre-formed webbing. This webbing can form a pocket area 30, typically encompassing the lower portion or half of the netting 28 in the head 14. The pocket area 30 is configured to receive and support a ball (not shown) in the open region 26 during use of the stick 12. In operation, for example, the netting 28 or the webbing may flex relative to the frame 16 so as to allow a majority of the ball to pass through the frame to enter the pocket area 28. At the bottom 20, the frame 16 secures to an elongate shaft 32 with ends (e.g., a first end 34 and a second end 36) and an interactive region 38 disposed therebetween. Examples of the elongate shaft 32 can form a cylinder that is hollow, either fully or partially. A cap 40 may be configured to couple with the second end 36 to cover the opening to the cylinder. The stick 12 may include a terminal device 42 and actuator 44, for example, a push-button device. Examples of the terminal device 42 may reside inside the hollow shaft 32 in the interactive region, preferably as a small board or like chip-set with a number of discrete devices disposed on a substrate (e.g., printed circuit board (PCB), flexible circuit, etc.). During game play, the players 102, 104 manipulate the shaft 30 to maintain possession of the ball in the head 14, via "cradling," as well as to pass a ball to each other, catch a ball, pick-up a ball, or shoot a ball at the target frame 128 or the goal 130.

The lacrosse stick 12 may also include sensors that, for example, generate ball-related data that corresponds to presence or absence of a ball in the head 14. These sensors may be part of a training aid, which may integrate into components of the stick 12 or, in one example, embody a system or kit of parts that attach to the stick 12 to generate the ball-related data. In FIG. 3, the stick 12 may include a sensor 46 at and/or near the pocket area 30 of the netting 28, whether integrated into the frame 16, coupled to the netting 28, or in other configurations. Examples of the sensor 46 can embody any variety of devices that can generate electronic signals. These devices may operate (to generate an electronic signal) in response to changes in properties of light (e.g., photodiode, photoresistor, break beam sensors), magnetic field (e.g., proximity sensors, Hall effect sensors), and/or position (e.g., tilt switches, accelerometers). For simplicity, the sensor 46 may also be mechanically activated (e.g., push-button, plunger-type sensors).

FIG. 4 shows one implementation in which the training aid benefits from a carrier member 48 with, for example, a strap member 50 that positions the body of the carrier member 48 so that the sensor 46 can interact with the ball, shown in phantom lines identified by the numeral 52. Examples of the strap member 50 can comprise material that is pliable, flexible, and/or resilient, although stiffer materials (e.g., plastics) may also suffice. The material can be sized to span across the frame 16 to couple with either sidewall 22, 24. Snaps, hooks, and like components on the strap member 50 and/or the frame 16 may be useful to securely attach the material in position on the head 14 and to maintain the sensor 46 in position in the pocket area 28.

The training aid can generate data that is useful to track presence, absence, and more generally, movement (or non-movement) of the ball 52 on venue 106. As noted throughout, the system 100 can use this "ball-related" data, often along with the real time position data, to accurately orchestrate movement of players 102, 104. This feature may particularly benefit actions that depend on which of the players 102, 104 is in possession of the ball 52, whether the ball 52 is in transit (or not in possession of either the players 102, 104), or that the ball 52 interacts with other peripherals 120 like the target frame 128 or the goal 130. In use, the sensor 46 may have states that are set in response to contact or proximity of the ball 52. These states may correspond with voltage or current levels, although other indicators may suffice. In one implementation, the ball 52 may set the state of the sensor 46 (e.g., at the high voltage level). This level may correspond with an electronic signal that indicates the presence of the ball 52 in the pocket area 30. The player 102, 104 can advance the ball 52 out of the pocket area 30 using a throwing motion. This motion causes the ball 52 to exit the pocket area 30 and, in turn, the sensor 46 may change state (e.g., from the high voltage level to the low voltage level). This level may correspond with an electronic signal (or absence thereof) that indicates the absence of the ball 52 in the pocket area 30. In one example, the ball 52 may strike the target frame 128 or a wall during individual practice, one or more of which may generate appropriate data to indicate the location of the ball 52. For groups of players 102, 104, the ball 52 may travel among players 102, 104 to change the state of the sensor 52 or the respective lacrosse stick 12 that is equipped with the training aid as contemplated herein. The player 102 may pass to the player 104 so that the player 104 can catch the ball 52 in the head 14 and, in turn, set the state of the sensor 46 (e.g., from the low voltage level to the high voltage level). This level may correspond with an electronic signal that indicates the ball 52 is in the pocket area 30 of the stick 12 of the player 104. Notably, the system 100 can be configured to use or process the signals from the sticks 12 at each player 102, 104 to properly select instructions to orchestrate the athletic activity.

Figure 5:
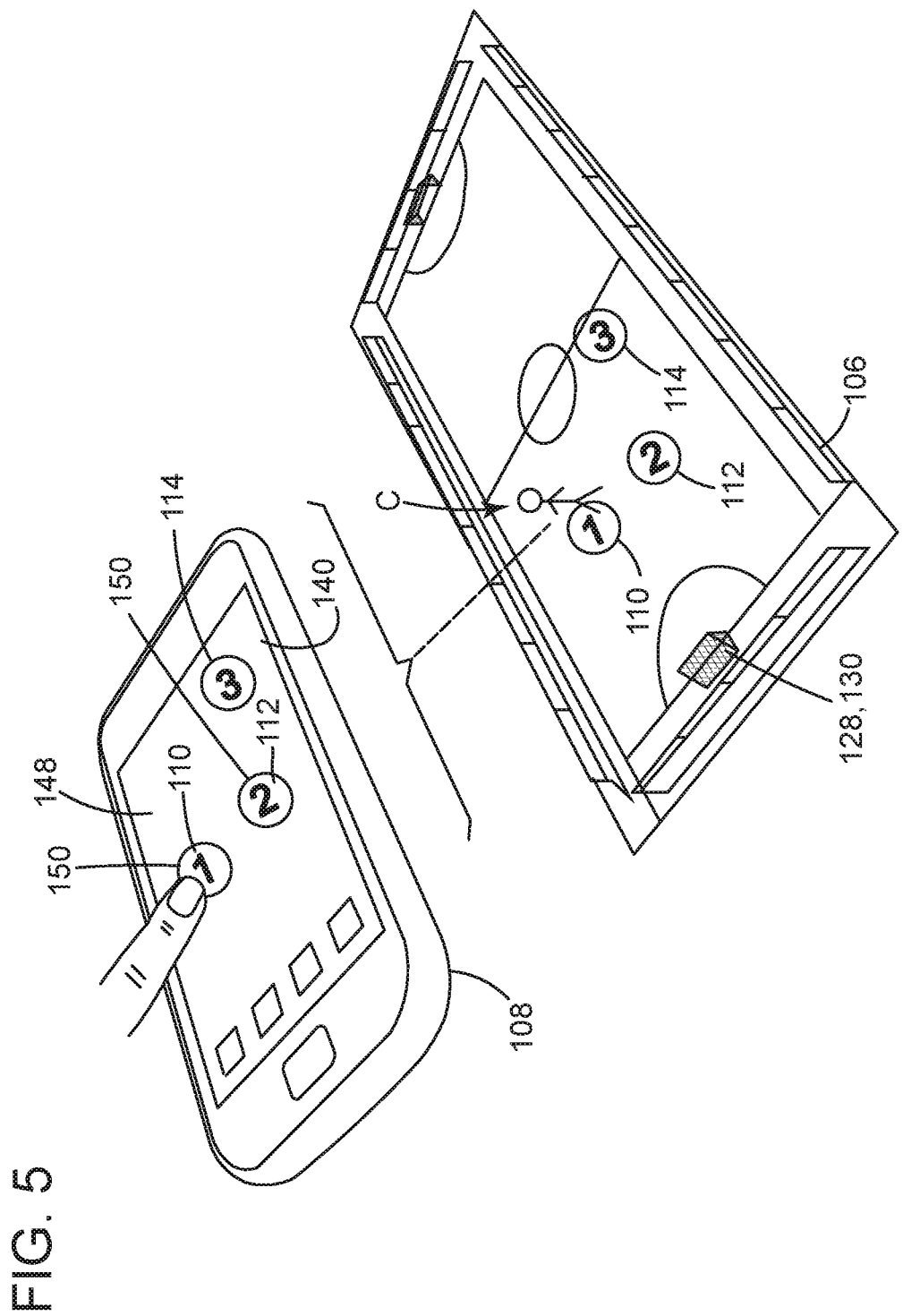
FIG. 5 depicts a schematic diagram of an example of the system of FIG. 1.
Figure 6:
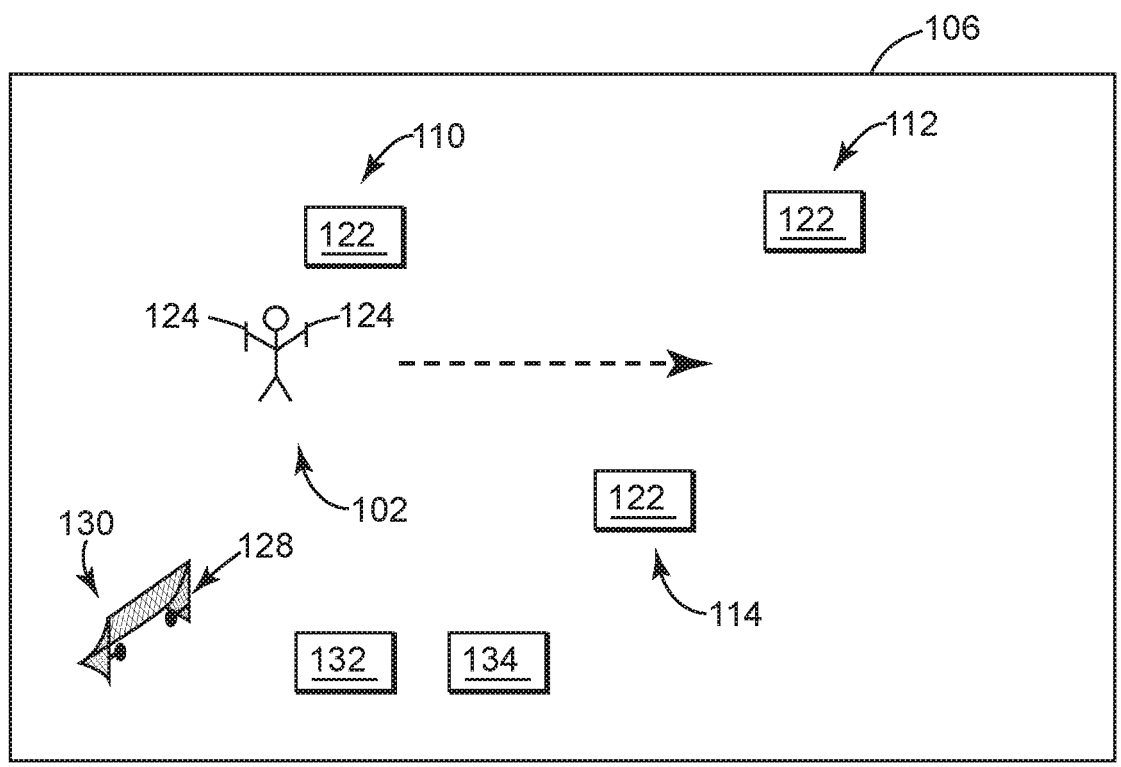
FIG. 6 depicts a schematic diagram of an example of the system of FIG. 1 to discuss operation of the system to instruct the athletes to perform actions.
Figure 7:
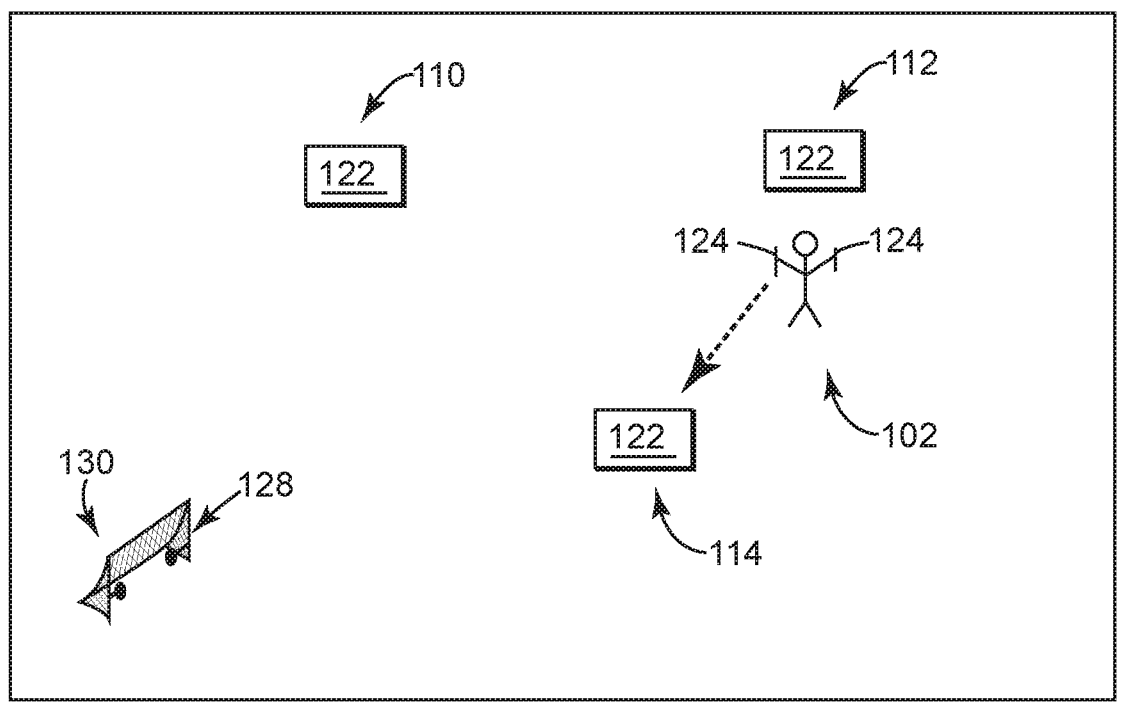
FIG. 7 depicts a schematic diagram of the example of FIG. 6.

FIGS. 5, 6, and 7 depicts a representation of the system 100 to discuss its operation. Referring first to FIG. 5, the display 140 may generate the interface 148 so that the icons 150 can allow the end user C to assign registration data to the tracked locations 110, 112, 114 on venue 106. For example, the end user C may walk onto venue 106 to the tracked location 110. To capture registration data, the end user C may depress the icon 150, which in turn stores the registration data to a repository. Prompts on the interface 148 may indicate when registration is successful. This process can repeat until the end user C captures registration data for each of the tracked locations (e.g., tracked locations 112, 114). In one implementation, the end user C may use the icons 150 to store registration data for other locations on venue 106, like the sides lines, end lines, box lines, goal lines, the plane of goal 130, etc.

The system 100 may be configured to compare real-time position data and ball-related data, where applicable, to a listing that associates the registration data with instructions or actions for the players 102, 104. Nominally, part of this process may determine whether the players 102, 104 meet certain positional criteria. Exemplary criteria may define proximity of the players 102, 104 to the tracked locations 110, 112, 114 or a distance between the players 102, 104 and the tracked locations 110, 112, 114. With reference to FIG. 6, the system 100 may process real-time position data (e.g., from stick 12) to generate a first instructional output that indicates that the player 102 is proximate tracked location 110. Examples of the first instructional output may illuminate a light or form a noise (e.g., at physical marker 122) so as to direct (or cause) the player 102 to transit from the first tracked location 110 to the second tracked location 112. Referring now to FIG. 7, the system 100 may process real-time position data (e.g., from stick 12) to generate a second instructional output that indicates the player 102 is proximate tracked location 112. Examples of the second instructional outputs may direct (or cause) the first player 102 to transit from the second tracked position 112 to the third tracked position 114, again using light or noise (e.g., at physical marker 122). In one example, the system 100 may use "ball-related" data that indicates the presence of the ball in the lacrosse stick 12 of the player 102. Such indication may, in turn, cause the system 100 to generate a third instructional output that directs (or causes) the first player 102 to throw the ball at the goal 130, while in transit or in response to proximity of the first player 102 to the third tracked location 114.

Figure 8:
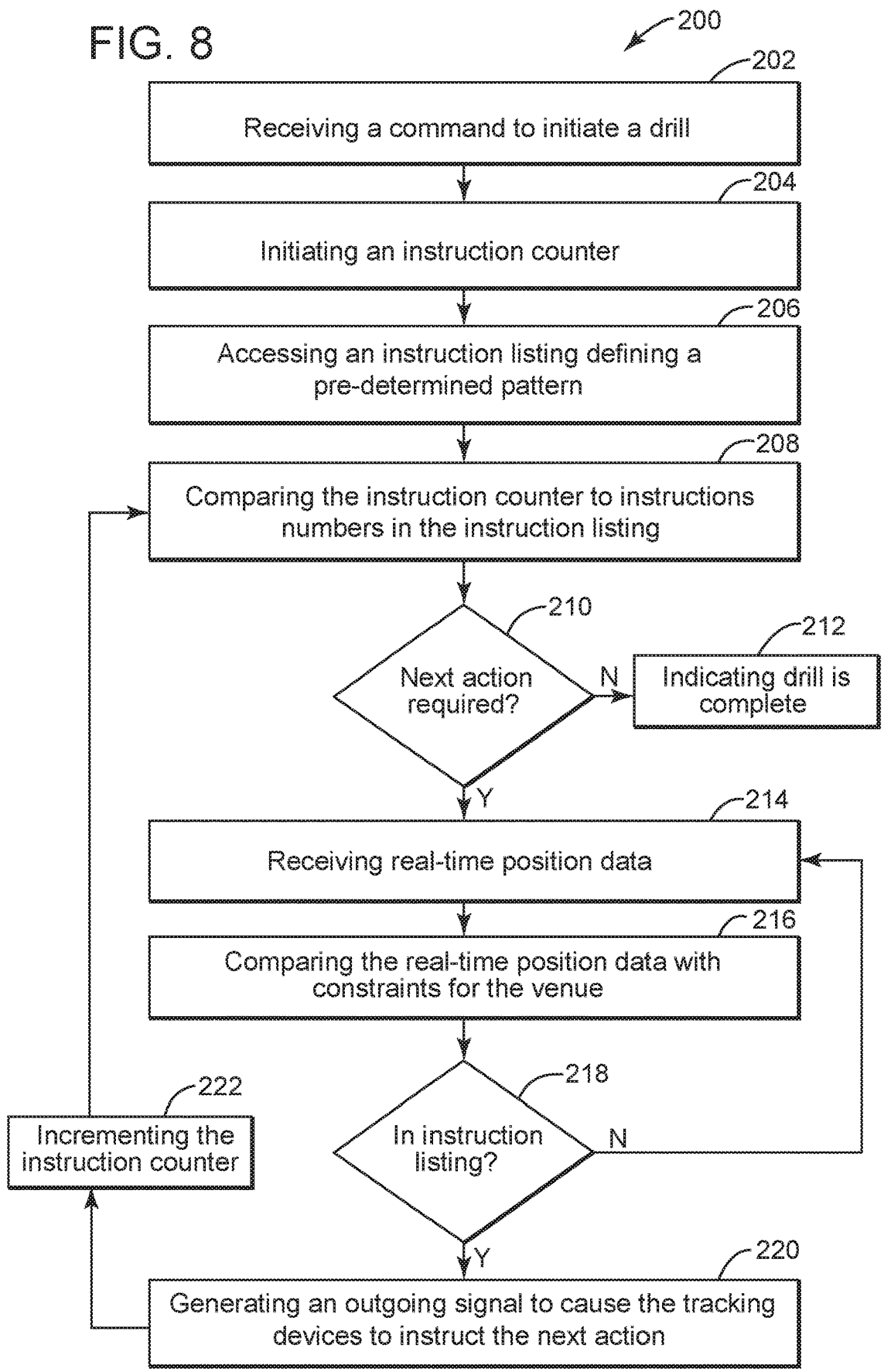
FIG. 8 depicts a flow diagram of an exemplary embodiment of a method for orchestrating movement of athletes on a venue.

FIG. 8 depicts a flow diagram of an exemplary method 200 to operate the system 100 to provide instructions to the players 102, 104. This diagram outlines stages that may embody executable instructions for one or more computer-implemented methods and/or programs. These executable instructions may be stored on the terminal 108 or in the server 118, as firmware or software, and configure a respective processor to perform certain functions (often to facilitate the stages). This processor may reside on the terminal 108 or in the remote computing device 119 connected to the network 116. The stages in this embodiment can be altered, combined, omitted, and/or rearranged in some embodiments.

Operation of the method 200 may cause the players 102, 104 to execute a drill. The method 200 may include, at stage 202, receiving a command to initiate a drill and, at stage 204, initiating an instruction counter. The method 200 may also include, at stage 206, accessing an instruction listing defining a pre-determined pattern. The method 200 may also include, at stage 208, comparing the instruction counter to the instruction numbers in the instruction listing. As shown in FIG. 8, the method 200 may include, at stage 210, determining whether a next action is required to complete the drill. If no action is required, the method 200 may continue, at stage 212, indicating the drill is complete. The method 200 may also include, at stage 214, receiving real-time position data, at stage 216, comparing the real-time position data with constraints (e.g., boundaries) for venue 106. The method 200 may further include, at stage 218, comparing real-time position data with information in the instruction listing. If the real-time position data does not match coordinates for tracked locations in the instruction listing, the method 200 may return to receiving the real-time position data at stage 214. The method 200 may also include, at stage 220, generating an output to convey the "next" instruction for the players 102, 104 and, at stage 222, incrementing the instruction counter. In one implementation, the method 200 may return back to stage 208 to compare the instruction counter and, then, determine whether any additional instructions are required to complete the drill.

At stage 202, the system 100 may receive the command to initiate the drill. This command may originate at the terminal 108, which may embody a smartphone or like device in possession of the end user. The display 140 may display the interface 148 (or graphical user interface or GUI) typical of a software program or "app." The interface 148 may provide certain icons that activate certain features of the program. The icons 150 may allow the end user to enter a command, e.g., by depressing or contacting one of the icons 150. In one implementation, the command can cause the smartphone to interact with the system 100 to ready the terminal 108 or peripherals 120 to start the drill.

At stage 204, the system 100 can initiate the instruction counter. This stage may correspond with the beginning of the drill with the players 102, 104 in initial or "start" positions on venue 106. The positions may correspond with tracked locations 110, 112, but this does not necessarily need to be the case. For example, the players 102, 104 may start at locations of venue 106 remote from any of the tracked locations 110, 112, 114.

At stage 206, the system 100 may access the instruction listing. Examples of the instruction listing may occur as a look-up table or like structured arrangement of information that defines the pre-determined pattern. Examples of the pre-determined pattern may describe the position for players 102, 104 for purposes of the drill. This information may be stored locally on the smartphone (e.g., storage memory 138) or resident in the cloud (e.g., server 118). Table 1 below provides one example for this look-up table.

TABLE 1

| Instruction No. | Coordinates | Action type | Output message |
|---|---|---|---|
| 1 | X1, Y1, Z1 (110), X3, Y3, Z3 (114) | RUN | 110 run to 114 |
| 2 | X2, Y3, Z3 (114), X2, Y2, Z2 (112) | PASS | 114 pass to 112 |
| 3 | X2, Y2, Z2 (112), X3, Y3, Z3 (114) | RUN | 112 run to 114 |
| 4 | X1, Y1, Z1 (110), X2, Y2, Z2 (112) | RUN | 110 run to 112 |
| 5 | X3, Y3, Z3 (114), X2, Y2, Z2 (112) | PASS | 114 pass to 112 |

This example aggregates all of instructions that define the various actions of the players 102, 104 to complete the drill. In use, this sequential listing may include any number of instructions. But preferably the number of instructions is sufficient to cause the players 102, 104 to perform actions that correspond with the drill. The instructions may be numbered consecutively, e.g., as instructions 1, 2, 3, 4, and 5 in Table 1. The example also associates information (e.g., coordinates, action type, and output message) with each of the numbered instructions.

At stages 208, 210, the system 100 can determine the next instruction for the drill. These stages may include, for example, comparing the instruction counter to the instruction numbers in the sequential listing (at stage 208). If the instruction counter does not correspond with the instruction numbers in the listing, the method 200 may indicate to the players 102, 104 that the drill or exercise is complete (at stage 212). This scenario may occur, for example, in response to the instruction counter in excess to the instruction numbers. The drill may be over because the method 200 exhausted all of the instructions in the sequential listing. In one implementation, the method 200 may include stages for generating an end of drill signal, such as lights or sounds that alert the players 102, 104 that no further instruction is forthcoming. The method 200 may, however, find the instruction counter so as to continue operation to instruct the players 102, 104 as to the actions of the drill.

At stage 214, the system 100 may receive the real-time position data from the peripherals 120. For example, the GPS-enabled device at the peripherals 120 may provide a constant or near-constant stream of data to the system 100. However, it might be useful for data to stream periodically (e.g., every 10 seconds) so as to form one or more data samples. This stage may include one or more stages for indexing the incoming data into a data table or other repository, as necessary.

At stage 216, the system 100 may compare the real-time position data with constraints (e.g., boundaries) for venue 106. This stage may confirm that the players 102, 104 are properly situated on the venue 106 to commence the drill. It may include one or more stages to indicate to the players 102, 104 the proper locations (e.g., through outputs noted herein) or to instruct the end user (e.g., coach) to address the positioning of the players 102, 104.

At stage 218, the system 100 may compare the real-time position data with coordinates for the tracked locations 110, 112, 112 in the instruction listing. This stage may be useful to indicate that one of the players 102, 104 is co-located with the peripheral 124, 126 (e.g., the smart lacrosse stick 12 or wearable electronic device) in proximity to or within a calculated distance to one of the tracked locations 110, 112, 114. In one implementation, the method 200 may also include stages for confirming that the real-time position data reflect correct locations in the current instruction number of the sequential listing of Table 1. These stages may include stages for comparing the position of the players 102, 104 relative to the tracked locations 110, 112, 114 (using real-time position data) or calculated distance to a threshold value. For the calculated distance, the method 200 may include one or more stages for determining a delta between the real-time position data and the coordinates for the tracked locations 110, 112, 114. This delta may resolve as X1-Xti, Y1-Yti, Z1-Zti, where X1, Y1, Z1 are the values for the real-time position data and Xti, Yti, and Zti are individual values for coordinates at the tracked locations 110, 112, 114). The stages may assign a relationship. This relationship may show that the real-time position data matches the coordinates or is within some allowable deviation or tolerance (e.g., ±x meters). For example, in Table 1, instruction 1 requires the player 102 to be located at tracked location 110. If the relationship indicates the real-time position data does not satisfy the threshold, and therefore that the player 102 is not at tracked location 110, then the method 200 may continue to receive data (e.g., at stage 214) until the data satisfies the threshold (and, in turn, the player 102 is in the correct locations) in the listing to trigger the instruction for the player 102 to run from tracked location 110 to tracked location 114.

At stage 220, the method 200 can generate the outgoing output or signal that causes the system 100 to instruct the action for the players 102, 104. For example, the output message of instruction 1 in Table 1 may cause the player 102 to run from the tracked location 110 to the tracked location 114. Once the player 120 arrives at the tracked location 114, the output message of instruction 2 may cause the player 102 to pass the ball to another player (e.g., player 104) at the tracked location 112.

At stage 222, the method 200 may increment the instruction counter. This stage may be important to avoid improper repetition of instructions in the sequential listing. This stage may utilize an incrementing value or "offset" (e.g., 1) that changes the value of the instruction counter from a first value to a second value that is different from the first value.

As noted previously, the system 100 may be configured to detect the presence or absence of a projectile (e.g. a ball, puck, or the like) at the portable equipment 124. The method 200 may leverage this ball-related data in conjunction or combination with the real time position data. For example, the method 200 may require the ball 52 to move between players 102, 104 or to be in a particular location (as indicated by the "ball-related" data in combination with the real time position data of the player 102, 104 in possession of the ball) as a prerequisite for incrementing the instruction counter at stage 222 or performing other stages. Such pre-requisites may be defined among the sequential listing of instructions. In practice, lacrosse game play may require players 102, 104 to use the stick 12 to catch and pass the ball 52 one or more times before proceeding to the next instruction. Or, the system 100 may require the players 102, 104 to bounce the ball 52 from the stick 12 against a wall for a predetermined number of repetitions before the next instruction. Use of the "ball-related" data in combination with timing (e.g., by the timer 132 or other timing mechanism) may require the player at stage 222 to handle the ball for a set time frame or have a pre-determined time of possession before generating the next instruction. Such timing functions may also be used to impose time limits for an action independent of ball-related data if necessary.

The method 200 may continue back to determine the next action for the drill (at stage 208). In one implementation, the process can continue, or iterate, until the players 102, 104 complete each of the instructions in the sequential listing. The process may also terminate pre-maturely in response to commands from the end user or expiration of a shot clock or timer.

Figure 9:
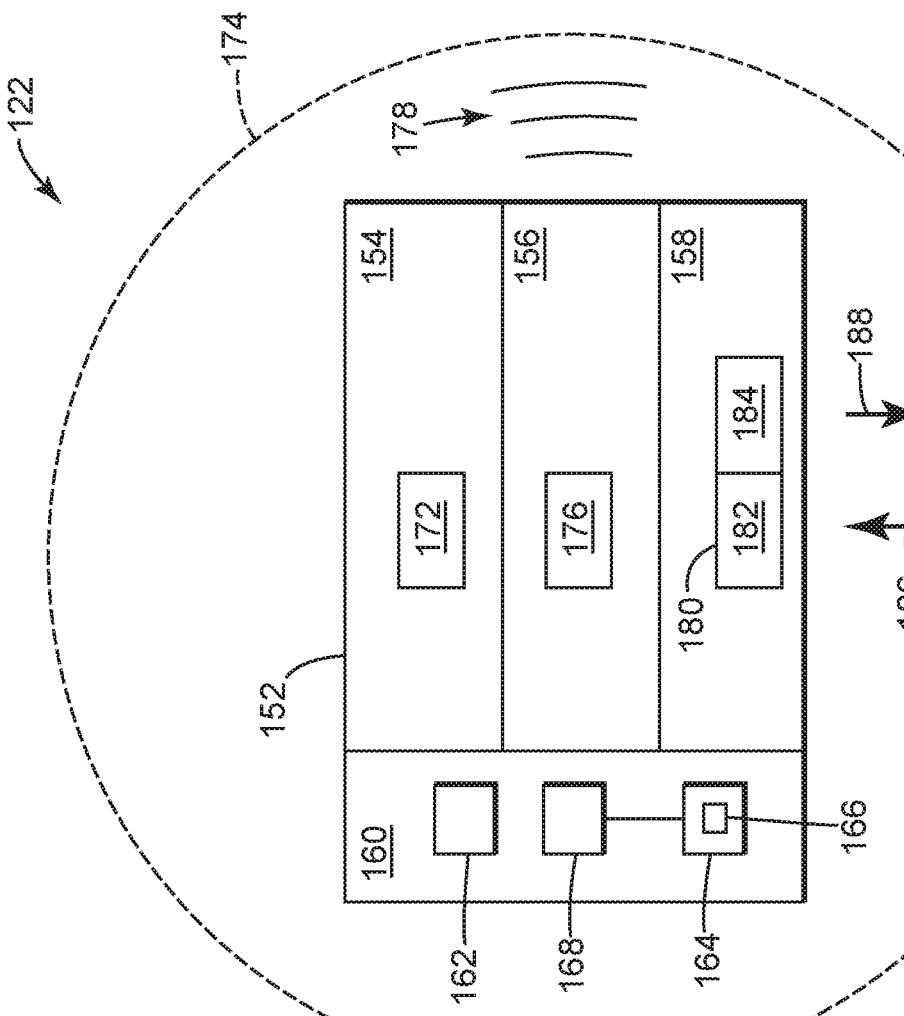
FIG. 9 depicts a schematic diagram of an example of a marker for use in the system of FIG. 1.

FIG. 9 illustrates a schematic diagram of the physical marker 122 that may co-locate at tracked locations 110, 112, 114. The physical markers 122 may be useful to identify the tracked locations 110, 112, 114 during set up of the exercise or drill by a coach or trainer and also during execution of the exercise or drill by players 102, 104. In one embodiment, a physical marker may be a conventional bright orange, plastic cone although other colors, shapes, and materials may construct a similar form. In another embodiment, a physical marker may be a flat shape of flexible rubber imprinted with symbols (e.g. arrows) or words (e.g. pass, dodge, shoot, cut, sprint, throw, pick, block, etc.) that correspond to the action instructed to occur at the associated tracked location 110, 112, 114.

This example may include a body 152 that houses one or more components to facilitate instructions to the players 102, 104 as noted herein. These components may include a proximity detector 154, an instruction generator 156, and a communicator 158. The body 152 may also support control circuitry 160 that is useful to operate one or more of the components 154, 156, 158. The control circuitry 160 may include a power supply 162 that couples with a storage memory 164. Executable instructions 166 stored on storage memory 164 or accessible to processor 168 via network 116 may configure the processor 168 to perform certain functions that, in turn, cause the components 154, 156, 158 to operate so that the physical marker 122 can convey proper instructions to the players 102, 104. As also shown in FIG. 9, the proximity detector 154 may include a sensor 172 that creates a sensing zone 174 at least partially about the body 152. The instruction generator 156 may have an indicator 176 to assign output 178 various sensory characteristics (e.g., auditory, visual, tactile, etc.). The communicator 158 may include an input/output 180 that can be configured for use with wired or wireless communication protocols. Suitable configurations may include one or more of a transmitter 182 and a receiver 184, as necessary, to transmit and receive signals (e.g., a first signal 186 and a second signal 188).

The body 152 can be constructed for use in any number of activities. This construction should be robust so as to allow for use outside and/or in inclement weather. Rubber and/or rubberized surfaces may be helpful at least for any exposed surfaces. This feature may be of particular benefit for use structure that is to "receive" pressure from the players 102, 104, typically by way of impact from the foot. This feature may help to resist impact and to give the players 102, 104 proper "grip" on the body 144 as necessary. The materials may also find use on the surfaces that are in contact with a playing surface at venue 106. For example, higher friction materials may help to prevent movement of the body 152 relative to the playing surface. Other materials like metals, plastics, and composites may also serve to construct at least a portion of the body 152. Suitable materials may be compatible with certain electronics and electronics manufacturing to configure the physical marker 122 to generate, send, and receive signals 186, 188. In one example, the body 152 may be configured to receive certain fasteners (e.g., posts) that penetrate through the body 152 to engage the playing surface of venue 106. This feature can affix the device at the tracked locations 110, 112, 114.

The indicator 176 can include devices that generate stimuli for use as the output 178. Visual stimuli may leverage light sources of varying constructions (e.g., light emitting diodes (LEDs)). Light from the light sources may vary in color, brightness, and like parameters. For auditory stimuli, the indicator 176 may include speakers that can generate an audio sound. Examples of the audio sounds can include voices, whistles, beeps, and like verbal and non-verbal sounds. In one implementation, the indicator 176 may be configured with an actuator that can provide physical feedback at part of the body (e.g., the foot) of the players 102, 104. This actuator may include a motor that vibrates. Other actuators may create impact (e.g., a piston and cylinder), although this disclosure contemplates a wide range of devices to impart sufficient force to alert the players 102, 104 of any relevant instructions.

Figure 10:
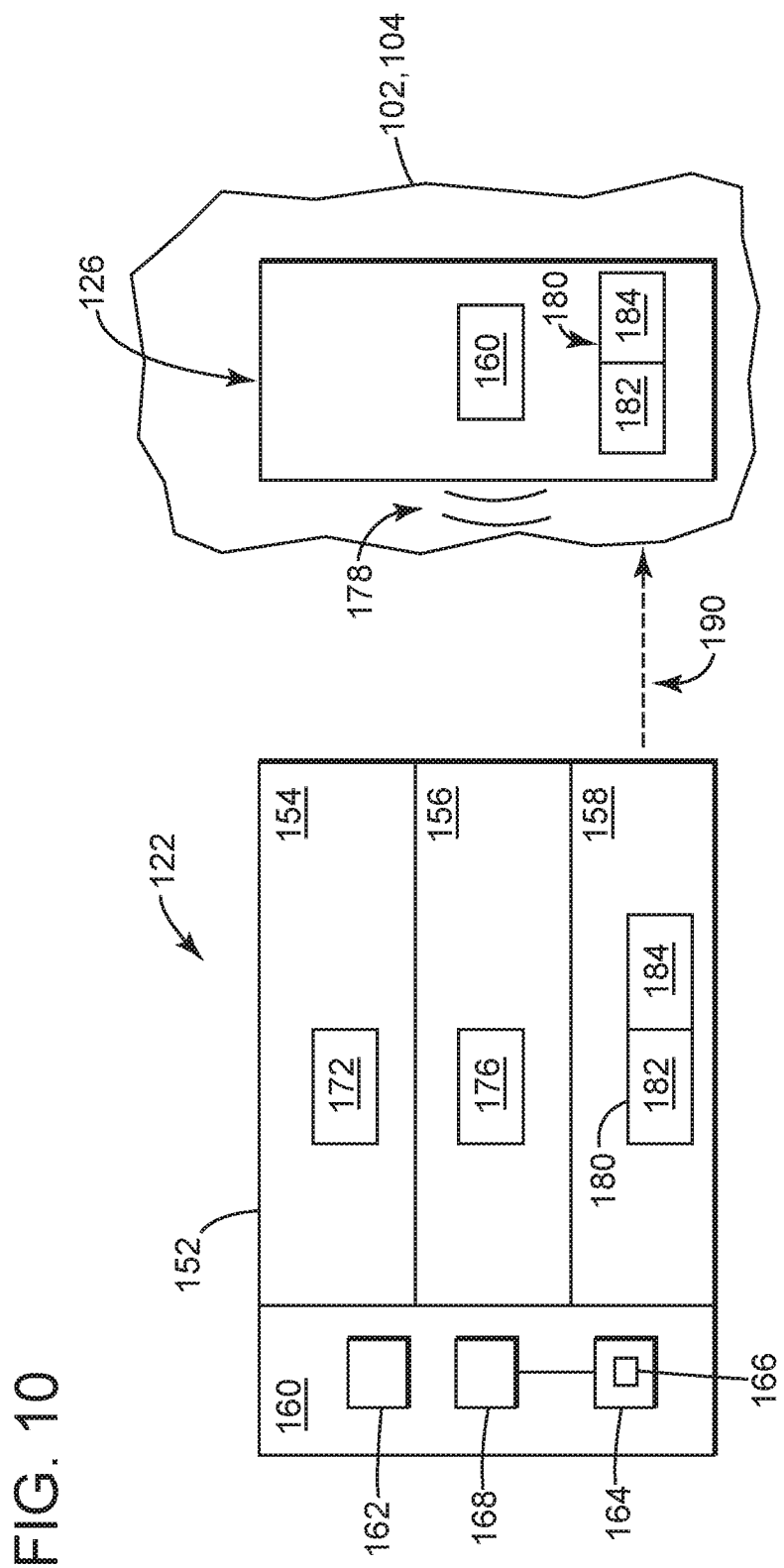
FIG. 10 depicts a schematic diagram of an example of a marker and a wearable for use in the system of FIG. 1.

FIG. 10 illustrates a schematic diagram of exemplary structure for the wearable 126 that can generate stimuli locally at the players 102, 104. This structure may embody a watch, wristband, and like connectable component worn on the clothing, although a smartphone (or like computing device) may also suffice. In some aspects, the wearable 126 may embed in a ball, hat, helmet, stick, and the like. The indicator 176 may reside on the wearable 126. In this way, the wearable 126 might exchange a signal 190 with the terminal 108, the peripherals 120, or the system 100 (in general) to generate the output 178. This exchange may occur via wired or wireless protocols that, as shown here, may leverage components of the input/output 180 found on the wearable 126.

Figure 11:
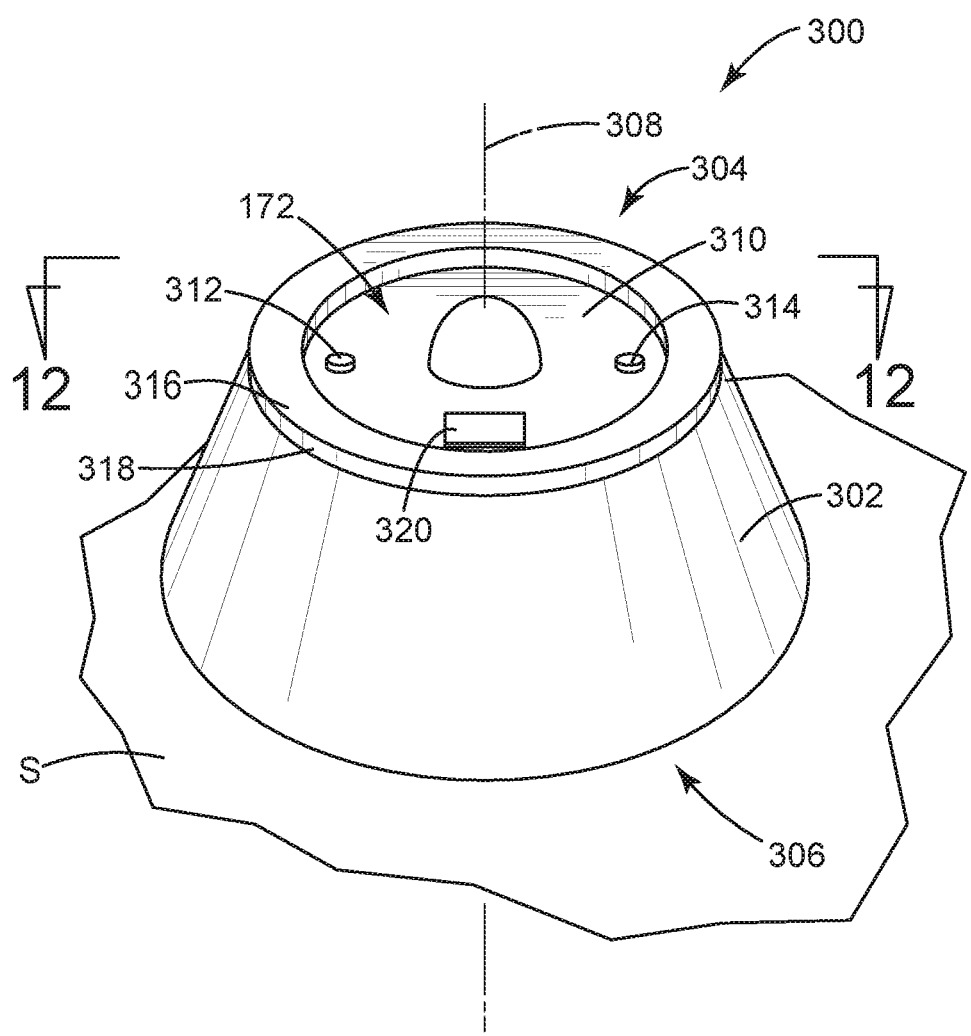
FIG. 11 depicts a perspective view of exemplary structure for the marker of FIGS. 9 and 10.

FIG. 11 depicts a perspective view of an exemplary structure 300 for the physical marker 122. This embodiment includes a peripheral wall 302 with a top 304 and a bottom 306 on a playing surface S. The peripheral wall 302 can assume geometry that is frusto-conical. This geometry forms a center axis 308 and a flat, annular surface 310 at the top 313. The sensor 156 may reside proximate the center axis 308, extending above the annular surface 310 at the top 304 as necessary for proper use to form the sensing zone 156. The indicator 158 may embody one or more lighting devices (e.g., a first lighting device 313, a second lighting device 314, and a third lighting device 316). As shown, the lighting devices 313, 314 may be disposed on the annular surface 310 of the top 304. Use of the player tracking device 300 may also benefit from light sources disposed in other areas of the peripheral wall 303. The lighting device 316 may form an annular ring 318 that circumscribes the center axis 308. The annular ring 318 may be disposed at the periphery of the top 304, although this position may vary as desired, for example, about the peripheral wall 303. In one implementation, the player tracking device 300 may also include a control 330 to interface with operative features of the control circuitry 144 (not shown). The control 330 may include components like an on/off switch, display, keypad, and the like.

Figure 12:
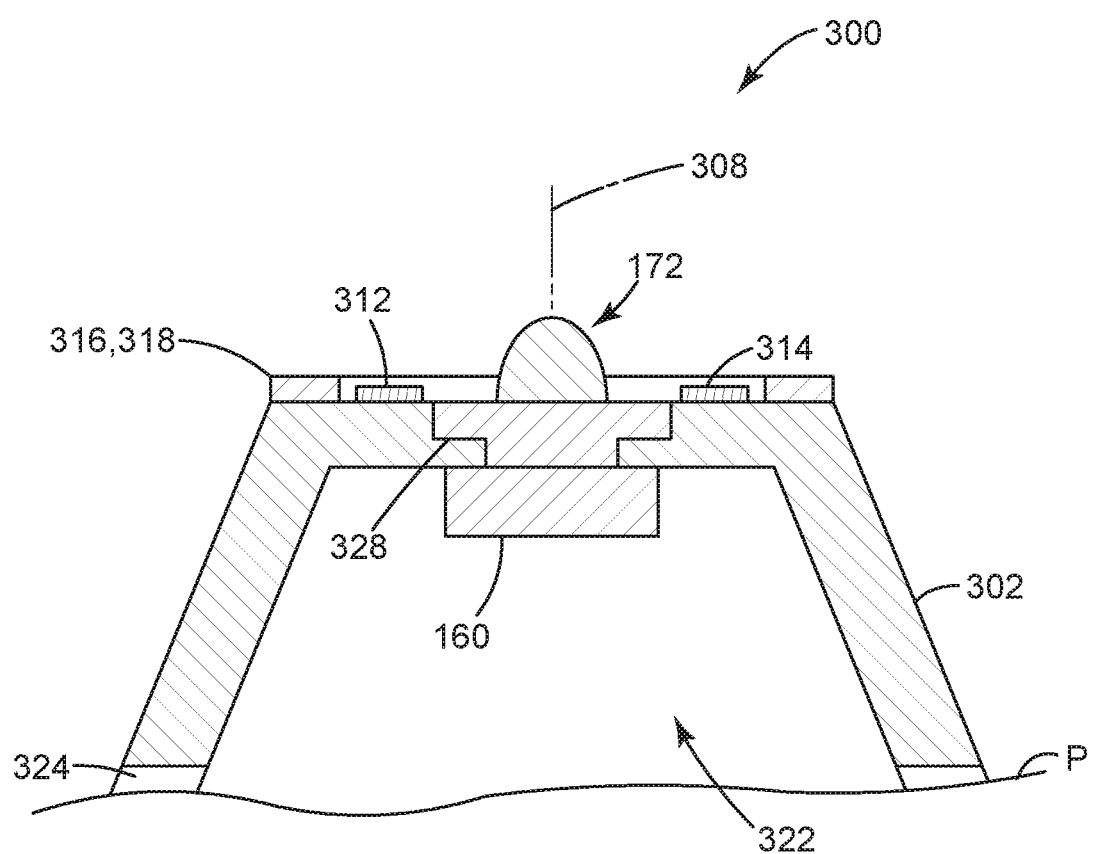
FIG. 12 depicts an elevation view of the cross-section of the example of FIG. 11.

FIG. 12 depicts an elevation view of the cross-section of the structure 300 of FIG. 11. The peripheral wall 302 can at least partially circumscribe the center axis 308 to form an interior cavity 322. At the bottom 306, the peripheral wall 302 may terminate at a contact member 324. Examples of the contact member 324 may comprise "non-slip" or like high-friction material (e.g., rubber) to prevent movement of the player tracking device 300 relative to the playing surface S. As also shown in FIG. 10, the control circuitry 160 may couple with the top 304 on a surface 336 of the peripheral wall 303 that bounds the interior cavity 322. One or more connections 338 may penetrate the peripheral wall 303 (shown here at the top 304) to couple the components resident on the top 304 with the control circuitry 160. Potting material may be disposed liberally in the interior cavity 322 to secure and protect the electrical components of the control circuitry 160. In one implementation, construction of the peripheral wall 302 may integrate one or more of these electrical components using, for example, manufacturing techniques found in embedded circuit, flexible circuit, solid-state technologies.

Figure 13:
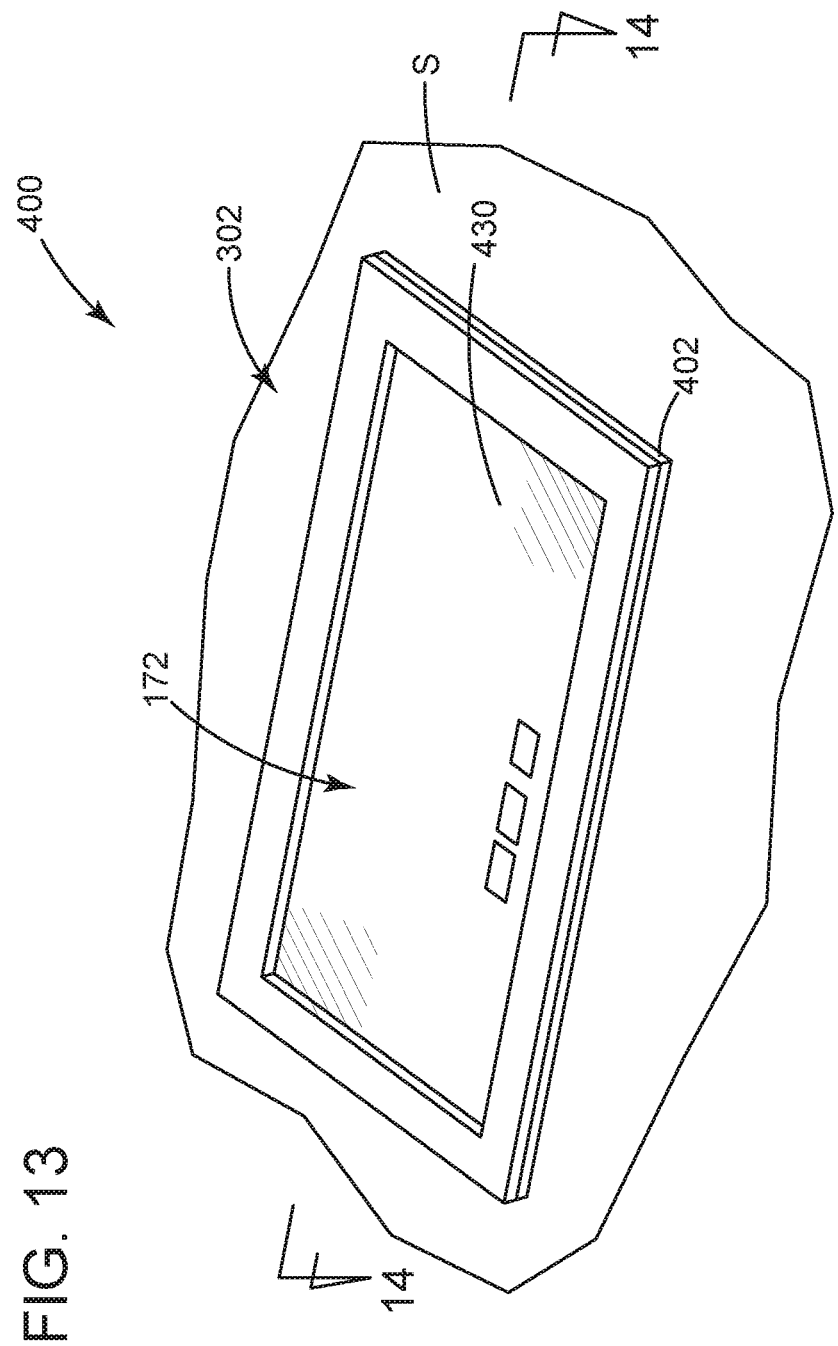
FIG. 13 depicts a perspective view of exemplary structure for the marker of FIGS. 9 and 10.
Figure 14:
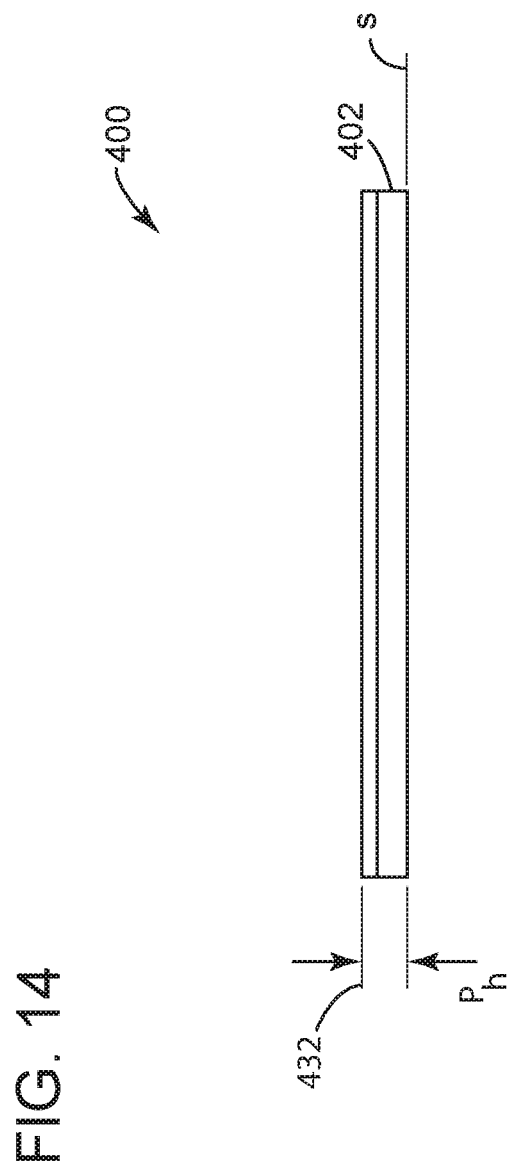
FIG. 14 depicts a elevation view from the side of the marker of FIG. 13.

FIGS. 13 and 14 depict an exemplary structure 400 for the physical marker 122. In this example, the geometry of the peripheral wall 402 is generally flat or planar. Its shape may be rectangular, as shown, although the device may be amenable to many different shapes (e.g., circular, oval, square, etc.). The sensor 172 may embody a contact sensor 430 that is disposed on the top 304. As best shown in FIG. 12, the device 400 has a profile height $P_h$ to prevent it from obstructing and/or hindering activities on the playing surface S. The profile height $P_h$ may define a distance as measured, for example, between the playing surface S and a plane 332 that is tangent to at least two points to an outer most surface on the device 300.

The contact sensor 430 can be configured to relay incidence of contact between the players 102, 104 and the device 400, generally. These configurations may use pressure and/or force sensitive elements ("sensing elements"), although optical and/or auditory elements may also prove useful in certain applications. The elements may disperse variously throughout the contact sensor 430. During operation, these elements may generate a signal in response to changes in pressure that the player 102, 104 applies, for example, by stepping proximate (and, likely, on) the sensing elements. This signal can transit to the control circuitry 160

(not shown), which itself may embed or integrate into the peripheral wall 302, as desired.

Figure 15:
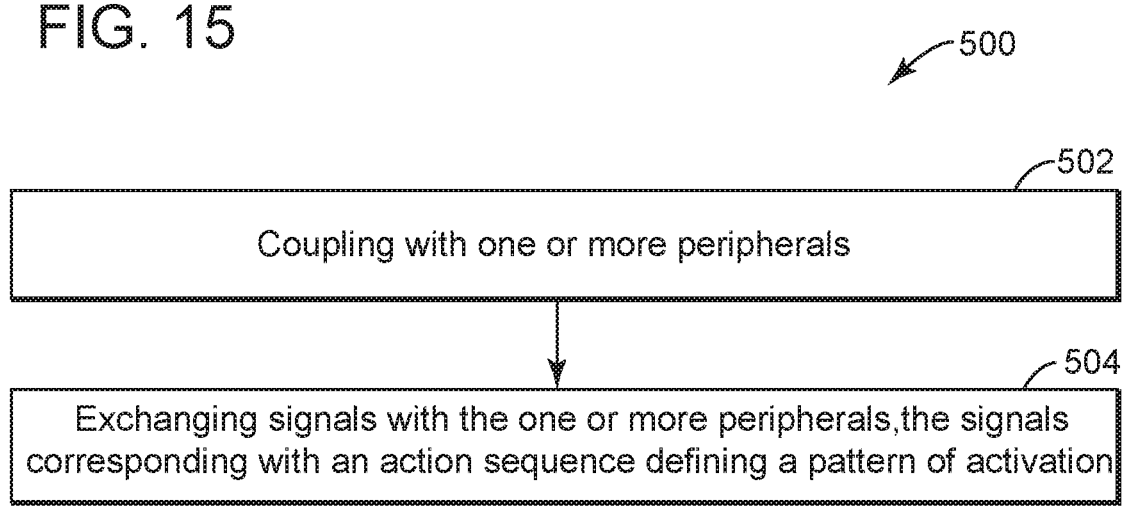
FIG. 15 depicts a flow diagram of an exemplary embodiment of a method for operating peripherals to coordinate movement of one or more athletes during a drill or exercise.

FIG. 15 depicts a flow diagram of an exemplary embodiment of a method 500. This embodiment may include, at stage 502, coupling with one or more peripherals and, at stage 504, exchanging signals with the one or more peripherals, the signals corresponding with an action sequence defining a pattern of activation. In one implementation, the action sequence may define the play and/or drill that the individuals are to perform during practice and/or game play. The pattern of activation can correspond with the order the players are to interact with the peripherals, namely the physical markers 122.

One or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein.

Computing components (e.g., memory and processor) can embody hardware that incorporates with other hardware (e.g., circuitry) to form a unitary and/or monolithic unit devised to execute computer programs and/or executable instructions (e.g., in the form of firmware and software). As noted herein, exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In light of the foregoing discussion, the embodiments here may simplify "coaching" significantly. Operation of the terminal and player tracking devices as noted can convey drills, positions, and exercises directly to the participant players. A technical effect is to automate processes that might require human intervention (of a coach or instructor), effectively allowing single and small groups of players to actively participate in structured programs to improve their skills. In this regard, the examples below include certain elements or clauses one or more of which may be combined with other elements and clauses to describe embodiments contemplated within the scope and spirit of this disclosure.

What is claimed is:

1. A method, comprising:
receiving position data, in real-time, that relates to a location of a player on a venue;
comparing the position data with registration data for tracked locations on the venue found in an instruction listing;
selecting an instruction from the instruction listing indicating that the real-time position data corresponds with the registration data for the tracked locations; and
generating an output that conveys the instruction to the player to perform an action,
wherein the action is part of a sequential listing of instructions for the player to execute among the tracked locations in a pre-determined pattern.

2. The method of claim 1, wherein the pre-determined pattern requires the player to transit from one of the tracked locations to another of the tracked locations.

3. A method, comprising:
receiving ball-related data that relates a location of a projectile relative to portable equipment carried by the player;
receiving position data, in real-time, that relates to a location of a player on a venue;
comparing the position data with registration data for tracked locations on the venue found in an instruction listing;
selecting an instruction from the instruction listing indicating that the real-time position data corresponds with the registration data for the tracked locations; and
generating an output that conveys the instruction to the player to perform an action,
wherein the instruction indicates that the ball-related data corresponds with data found in the instruction listing.

4. The method of claim 3, wherein the instruction indicates that both the ball-related data and the position data correspond with data in the instruction listing.

5. The method of claim 4, wherein the position data corresponds with GPS data from the portable equipment.

6. The method of claim 3, further comprising:
sensing presence or absence of the projectile on the portable equipment.

7. The method of claim 3, further comprising:
using a sensor disposed on the portable equipment to generate the ball-related data, wherein the sensor is configured to change state in response to contact from the projectile to indicate presence or absence of the projectile on the portable equipment.

8. The method of claim 7, wherein the portable equipment comprises a lacrosse stick having a head with a frame forming an open region to receive the ball, the head comprising netting that covers the open region, the netting configured to flex relative to the frame so as to allow a majority of the ball to pass through the frame to activate the sensor.

9. A method, comprising:
providing a terminal with a display;
generating an interface on the display with icons that are configured to capture registration data for tracked locations on a venue;

receiving position data, in real-time, that relates to a location of a player on the venue;

comparing the position data with the registration data for the tracked locations on the venue found in an instruction listing;

selecting an instruction from the instruction listing indicating that the real-time position data corresponds with the registration data for the tracked locations; and generating an output that conveys the instruction to the player to perform an action.

10. The method of claim 9, wherein the registration data corresponds with GPS data from the terminal.

11. A method, comprising:

receiving data from a lacrosse stick, the data defining a position for a player carrying the lacrosse stick and presence or absence of a ball in the lacrosse stick;

comparing the data from the lacrosse stick to data in an instruction listing;

selecting an instruction from the instruction listing indicating that the data from the lacrosse stick corresponds with the data in the instruction listing; and generating an output that conveys the instruction to the player to perform an action.

12. The method of claim 11, wherein the instruction indicates that the position of the player is proximate a tracked location that defines coordinates on a venue.

13. The method of claim 11, wherein the action is for the player to transit from one location to another location on the venue.

14. The method of claim 11, wherein the action is for the player to eject the ball from the lacrosse stick.

15. The method of claim 11, wherein the data from the lacrosse stick corresponds with contact between the ball and netting of the lacrosse stick, the netting found in a frame and configured to flex relative to the frame so as to allow a majority of the ball to pass through the frame to activate a sensor.

16. A method, comprising:

tracking movement of a player relative to tracked locations on a venue and of a ball relative to a lacrosse stick that is carried by the player;

using the movement to select an instruction from the instruction listing; and generating an output that conveys the instruction to the player to perform an action.

17. The method of claim 16, wherein movement of the player corresponds with proximity of the player to the tracked locations as indicated by real-time position data for the player and coordinates for the tracked locations on the venue.

18. The method of claim 17, further comprising:

receiving the real-time position data from a GPS-enabled device resident on the player.

19. The method of claim 16, wherein movement of the ball corresponds with ball-related data that defines presence or absence of the ball in flexible netting that forms part of the lacrosse stick.

20. The method of claim 19, further comprising;

receiving the ball-related data from a sensor disposed proximate the flexible netting.

\* \* \* \* \*